United States Patent
Astrom et al.

(10) Patent No.: US 8,489,758 B2
(45) Date of Patent: Jul. 16, 2013

(54) METHOD OF TRANSMITTING DATA IN A COMMUNICATION SYSTEM

(75) Inventors: Henrik Astrom, Solna (SE); Julian Spittka, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 187 days.

(21) Appl. No.: 12/456,021

(22) Filed: Jun. 10, 2009

(65) Prior Publication Data

US 2010/0198980 A1 Aug. 5, 2010

(30) Foreign Application Priority Data

Feb. 2, 2009 (GB) .................................. 0901676.7

(51) Int. Cl.
*G06F 15/16* (2006.01)
(52) U.S. Cl.
USPC ........... 709/231; 370/328; 370/231; 370/232; 375/240; 375/259
(58) Field of Classification Search
USPC .......................................................... 709/231
See application file for complete search history.

(56) References Cited

U.S. PATENT DOCUMENTS

| | | | |
|---|---|---|---|
| 6,272,633 B1 * | 8/2001 | Duke et al. ..................... | 713/171 |
| 6,807,528 B1 | 10/2004 | Truman et al. | |
| 7,080,308 B2 * | 7/2006 | Schroeder ..................... | 714/758 |
| 2003/0161346 A1 * | 8/2003 | Annadurai et al. ........... | 370/473 |
| 2004/0125774 A1 * | 7/2004 | Hoyt ............................. | 370/338 |

(Continued)

FOREIGN PATENT DOCUMENTS

| | | |
|---|---|---|
| DE | 101 18 192 A1 | 10/2002 |
| EP | 1 146 679 A2 | 10/2001 |

(Continued)

OTHER PUBLICATIONS

International Search Report for Application No. GB0901676.7, dated Mar. 30, 2009, 1 page.

(Continued)

*Primary Examiner* — Tammy Nguyen
*Assistant Examiner* — Natisha Cox
(74) *Attorney, Agent, or Firm* — Wolfe-SBMC

(57) ABSTRACT

A method and system for transmitting data over a channel of a network. The method comprises: receiving data at a first node; encoding a first portion of the data at a first bit rate to generate a first encoded data stream; monitoring an indication of the capacity of the channel; transmitting to the second node a padded data stream via the channel, wherein padding bits are added to the first encoded data stream, in dependence on the indication of the capacity of the channel, to generate the padded data stream; determining if transmitting the padded data stream exceeds the capacity of the channel; and encoding a second portion of the data at a higher bit rate than the first bit rate, to generate a second encoded data stream for transmission over the channel, if it is determined that transmitting the padded data stream does not exceed the channel's capacity.

18 Claims, 6 Drawing Sheets

U.S. PATENT DOCUMENTS

| | | |
|---|---|---|
| 2004/0160979 A1 | 8/2004 | Pepin et al. |
| 2005/0055620 A1* | 3/2005 | Thakur et al. ............... 714/758 |
| 2005/0080622 A1* | 4/2005 | Dieterich et al. ............ 704/229 |
| 2006/0026294 A1* | 2/2006 | Virdi et al. .................. 709/232 |
| 2007/0019674 A1 | 1/2007 | Bourlas et al. |
| 2007/0053446 A1* | 3/2007 | Spilo ............................ 375/259 |
| 2007/0076754 A1* | 4/2007 | Krishnaswamy ............ 370/468 |
| 2007/0195894 A1* | 8/2007 | Shokrollahi et al. ......... 375/242 |
| 2007/0223697 A1* | 9/2007 | Mizuno ........................ 380/245 |
| 2010/0121974 A1* | 5/2010 | Einarsson et al. ........... 709/231 |

FOREIGN PATENT DOCUMENTS

| | | |
|---|---|---|
| EP | 1 499 091 A1 | 1/2005 |
| EP | 1 681 813 A2 | 7/2006 |
| JP | 2006345523 | 12/2006 |
| JP | 2009278521 | 11/2009 |

OTHER PUBLICATIONS

Notification of Transmittal of the International Search Report and the Written Opinion of the International Searching Authority for Int'l Application No. PCT/EP2010/050055; Date Mailed: Aug. 2, 2010.

"Advisory Action", U.S. Appl. No. 12/456,021, (Sep. 22, 2011), 3 pages.

"Examination Report", EP Application No. 10700828.6, (Apr. 19, 2012), 4 pages.

"Search Report", GB Application No. 0901676.7, (Mar. 30, 2009), 1 page.

"Foreign Office Action", JP Application No. 2011-546729, (Feb. 26, 2013), 6 pages.

* cited by examiner

METHOD OF TRANSMITTING DATA IN A COMMUNICATION SYSTEM

RELATED APPLICATION

This application claims priority under 35 U.S.C. §119 or 365 to Great Britain Application No. 0901676.7, filed Feb. 2, 2009. The entire teachings of the above application are incorporated herein by reference.

FIELD OF THE INVENTION

The present invention relates to a communication system. More particularly the present invention relates to a method and apparatus for encoding, transmitting and receiving data in a communication system.

BACKGROUND OF THE INVENTION

In a communication system a communication network is provided, which can link together two communication terminals so that the terminals can send data to each other in a call or other communication event. The data may include speech, text, images or video.

Modern communication systems are based on the transmission of digital signals. One type of communication network suitable for transmitting digital data is the Internet. Protocols which are used to carry voice signals over the Internet and other packet switched based networks are commonly referred to as Voice over Internet Protocol (VoIP).

Data, such as speech, may be input into an analogue input device of a terminal such as a microphone. The analogue signal output from the microphone is converted at the terminal to a digital signal by an analogue to digital converter. The digital signal is then encoded and placed in data packets for transmission to another terminal via the communication network.

Data packets are transmitted via the communication network. Each data packet includes a header portion and a payload portion. The header portion of the data packet contains information for transmitting and processing the data packet. This information may include an identification number and a source address that together uniquely identify the packet, a time stamp and a destination address. The payload portion of the data packet includes the encoded input signal. For example if the input signal is an audio signal the payload portion of the data packet may include encoded audio frames, wherein each frame represents a portion of the analogue signal.

Data packets transmitted via a packet switched network such as the Internet, share the resources of the network. Data packets may take different paths to travel across the network to the same destination and are therefore not transmitted via a dedicated 'channel' as in the case of circuit switched networks. However, it will be readily appreciated by a person skilled in the art that the term 'channel' may be used to describe the connection between two terminals via the packet switched network, and that the capacity of such a channel describes the maximum bit rate that may be transmitted from the transmitting terminal to the receiving terminal via the network.

Different types of encoding methods encode data at different bit rates. For example the codec ITU (International Telecommunication Union) G.722, a wideband codec (16 kHz sampling frequency), encodes data at a fixed high bit rate of 64 kbit/s and may be used to encode speech for transmission over a channel with a capacity to transfer bits at this high rate. The capacity of the channel is related to the bandwidth of the channel. A channel with a capacity to transfer bits at a high rate has a high bandwidth. Generally, encoding data at a high bit rate permits a detailed representation of the input signal to be encoded, which results in a high quality decoded signal. Conversely, ITU G.729, a narrowband codec (8 kHz sampling frequency), encodes data at a fixed low bit rate of 8 kbit/s and may be used to encode speech for transmission over a channel with a capacity to only transfer data at a low bit rate, i.e. a channel having a low bandwidth. A signal encoded at a low bit rate is a sparse representation of the input signal which may result in a lower quality decoded signal, due to the limited information in the decoded signal. A higher quality decoded signal may be achieved even when the signal is encoded at a low bit rate by employing a higher complexity encoding scheme. However a higher complexity encoding scheme requires greater processing resources at the encoder and/or decoder than a lower complexity encoding scheme.

When the capacity of a channel is exceeded, degradations to the signal such as delay or packet loss may occur. It is therefore desirable to transmit the signal at the highest possible bit rate without overloading the capacity of the channel. However since the resources of a packet switched network are shared, and since the topology of the network may change, the bandwidth of the channel is not fixed. Therefore encoding the data at the optimal bit rate during a call is problematic.

This problem is alleviated somewhat by use of an adaptive bit rate codec. Adaptive bit rate codecs encode data using a range of bit rates. For example Adaptive Multi Rate (AMR) codec may encode data at 12.2, 10.2, 7.95, 7.40, 6.70, 5.90, 5.15 and 4.75 kbit/s.

A bandwidth management module in the transmitting terminal is arranged to monitor whether the capacity of the channel is exceeded. This may be determined, for example, from the number of queued packets in the network buffers, or from the roundtrip time of data packets sent between the terminals. If it is determined that the maximum bandwidth of the channel is not being used, the adaptive bit rate codec may apply a higher bit rate to encode the data during the call.

However in some cases an adaptive bit rate codec may not be available to encode data. Incorporating an adaptive bit rate codec into a digital signal processor of a terminal may require excessive development time, or it may not be possible to incorporate an adaptive bit rate codec due to limitations of the processor. Also licensing an adaptive bit rate codec for use in the processor may be prohibitively expensive.

Furthermore even if a transmitting terminal is able to encode data using an adaptive bit rate codec, the adaptive bit rate codec may not be available at the receiving terminal to decode the data. As such the adaptive bit rate codec may not be used to encode data transmitted to the receiving terminal.

It is therefore an aim of the present invention to overcome the problems identified in the prior art. In particular it is an aim of the present invention to provide a method of encoding data at an optimal speech quality when only a limited number of bit rates are available to encode the data level, without overloading the channel or increasing latency.

SUMMARY OF THE INVENTION

According to embodiments of the present invention the capacity of the channel may be probed by incrementally increasing the bit rate transmitted via the channel, even when only a limited number of encoding bit rates is available. Thus embodiments of the present invention advantageously allow a way of transitioning between different encoding bit rates without overloading the channel or increasing latency.

According to a first aspect of the present invention there is provided a method of transmitting data from a first node to a second node via a channel of a communication network, said method comprising: receiving data at said first node; encoding a first portion of said data at a first bit rate to generate a first encoded data stream; monitoring an indication of the capacity of the channel; transmitting to the second node a padded data stream via said channel, wherein padding bits are added to the first encoded data stream, in dependence on the indication of the capacity of the channel, to generate the padded data stream; determining if transmitting said padded data stream exceeds the capacity of the channel, and encoding a second portion of said data at a higher bit rate than the first bit rate, to generate a second encoded data stream, if it is determined that transmitting the padded data stream does not exceed the capacity of the channel; and transmitting the second encoded data stream to the second node via said channel.

Preferably the data is only encoded using a higher bit rate codec when the capacity of channel is found to be sufficient.

Therefore in a preferred embodiment of the invention the second portion of said data is encoded at a higher bit rate only if it is determined that the bit rate of the padded data stream is substantially equivalent to the higher bit rate.

In some embodiments it is not necessary for the receiving terminal to be notified during call set up that padding may be added to the data packets to probe the capacity of the channel before the codec is switched. Instead, the receiving terminal may identify that padding has been added to the data packets in accordance with a standard RTP (Real-time Transport Protocol) format. RTP defines a standardized packet format for delivering audio and video over the Internet, developed by the standardization body IETF (Internet Engineering Task Force).

Therefore in further embodiments of the present invention the number of padding bits added to data packets of the first encoded data stream is indicated according to an RTP (Real-time Transport Protocol) standard.

According to the second aspect of the present invention there is provided a transmitter arranged to transmit data to a node via a channel of a communication network, said transmitter comprising: an input module arranged to receive data to be transmitted; an encoding module arranged to encode said received data at either a first bit rate or a second bit rate to generate an encoded data stream, wherein the second bit rate is higher than the first bit rate; an output module arranged to transmit the encoded data stream to the second node via the channel; a bandwidth management module arranged to monitor an indication of the capacity of the channel; and a padding module arranged to add padding bits to the encoded data stream when encoded at the first bit rate, in dependence on the indication of the capacity of the channel, to generate a padded data stream; wherein the bandwidth management module is arranged to determine if transmitting said padded data stream exceeds the capacity of the channel, and to control the encoding module to encode said received data at the second bit rate, if it is determined that transmitting the padded data stream does not exceed the capacity of the channel.

According to the invention in another aspect there is provided a computer program product comprising code arranged so as when executed on a processor to perform the steps of any of the methods described herein.

BRIEF DESCRIPTION OF DRAWINGS

For a better understanding of the present invention and to show how the same may be carried into effect, embodiments of the present invention will now be described with reference to the following drawings.

DETAILED DESCRIPTION OF THE INVENTION

Figure 1:
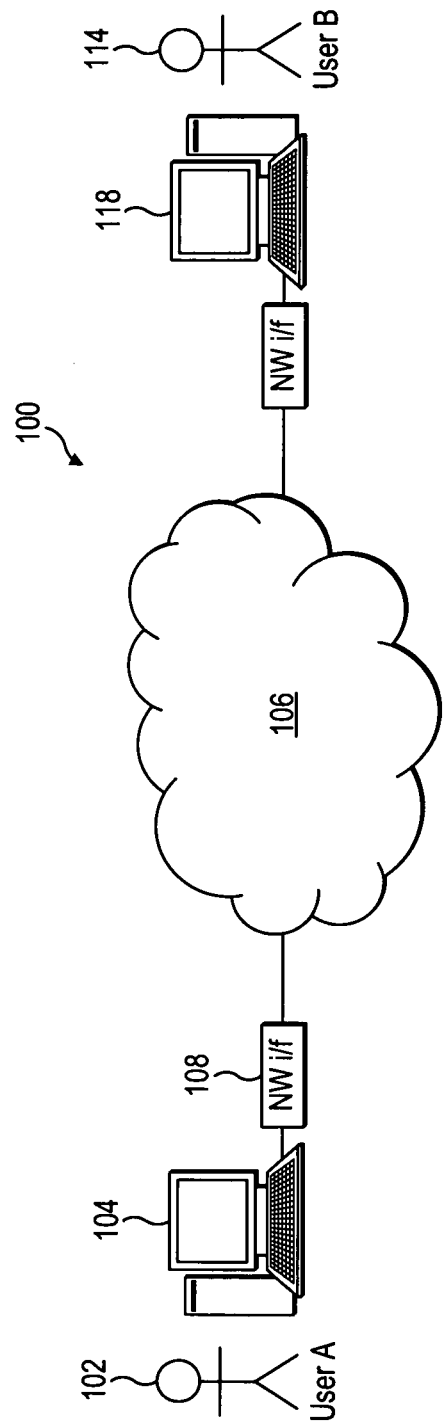
FIG. 1 is a diagram of a communication system.

Reference is first made to FIG. 1, which illustrates a communication system 100 used in an embodiment of the present invention. A first user of the communication system (denoted "User A" 102) operates a first user terminal 104, which is shown connected to a network 106, such as the Internet. The user terminal 104 may be, for example, a personal computer ("PC"), personal digital assistant ("PDA"), a mobile phone, a gaming device or other embedded device able to connect to the network 106. The first user terminal has a user interface means to receive information from and output information to User A. In a preferred embodiment of the invention the interface means of the user terminal comprises a speaker, a microphone, a display means such as a screen and a keyboard and/or pointing device. The user terminal 104 is connected to the network 106 via a network interface 108 such as a modem, access point or base station, and the connection between the user terminal 104 and the network interface 108 may be via a cable (wired) connection or a wireless connection.

User B 114 operates a second user terminal 118. Transmission of data, such as audio data, over the network 106, may occur during a call between a calling party (e.g. User A 102) and a called party (i.e. the destination—in this case User B 114). In one embodiment, the call is set up using a peer to peer protocol, wherein the route over the network 106 between the calling party and the called party is determined without the use of central servers. However, it will be understood that this is only one example, and other means of communication over network 106 are also possible.

During a call between the calling party and the called party, speech from User A 102 is input to user terminal 104. A transmitting system provided in the terminal 104, described in more detail hereinafter, encodes the speech and transmits the encoded signal to the user terminal 118 over a communication channel. The encoded speech signal transmitted to user terminal 118 is then decoded and output to User B 114.

As mentioned, the communication network 106 may be the Internet, and communication may take place using VoIP. However, it should be appreciated that even though the exemplifying communications system shown and described in more detail herein uses the terminology of a VoIP network, embodiments of the present invention can be used in any other suitable communication system where bandwidth resources are not fixed. For example the present invention may also be used in other access technologies where several users share limited bandwidth resources such as CDMA (Code Division Multiple Access) and WCDMA (Wideband CDMA) communication networks.

Figure 2:
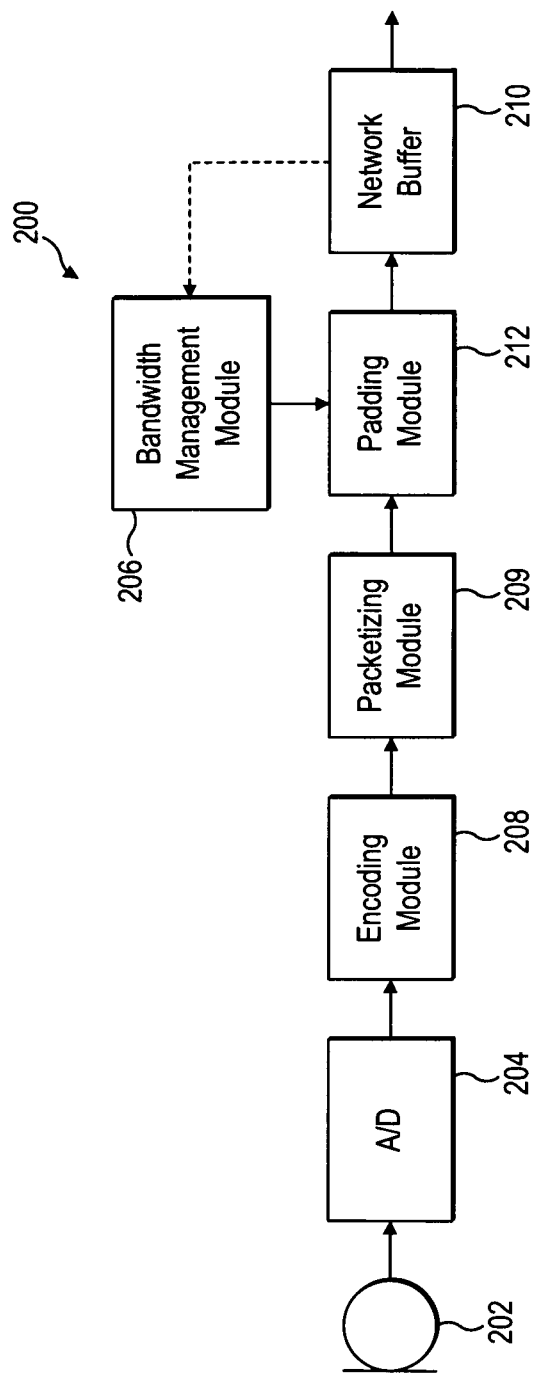
FIG. 2 is a diagram of a transmitter according to an embodiment of the present invention.

FIG. 2 shows a transmitting system 200 of the first user terminal 104 for transmitting data from the user terminal 104.

The transmitting system 200 comprises a microphone 202, an analogue to digital converter 204, a bandwidth management module 206, an encoding module 208, a packetizing module 209, a padding module 212, and a network buffer 210. It should be appreciated that the second user terminal 118 may comprise an equivalent transmitting system.

Components of the transmitting system 200 may be implemented as hardware in the terminal or as software running on a processor in the terminal. This is an implementation preference.

The encoding module 208 is arranged to encode data using a limited number of bit rates by using different modes of the same codec or using different codecs. In the exemplary embodiment of the invention the encoding module 208 is arranged to encode data at a bit rate of either 8 kbits or 64 kbits.

Switching between a low bit rate to a high bit rate to encode data during a call, may significantly overload the channel before it is detected that the channel is overloaded. Overloading the channel in this manner may cause the network buffers to fill up in a very short time. Even if the encoder switches back to using a low bit rate, processing data packets queued in the network buffers may take a long time which could result in high latency or low quality due to dropped packets.

Embodiments of the present invention provide a method for determining whether the bit rate used to encode data may be switched to a higher bit rate during a call without overloading the channel.

According to an embodiment of the invention, the padding module 212 is arranged to add padding bits to data packets output from the packetizing module 209 in order to gradually increase the bit rate transmitted from the terminal 104 to the terminal 118, such that the effect of transmitting a gradually increasing bit rate can be monitored. As such the capacity of the channel may be probed by incrementally increasing the transmitted bit rate, in order to determine whether data may be encoded using the higher bit rate, without the risk of significantly overloading the channel.

Figure 3:
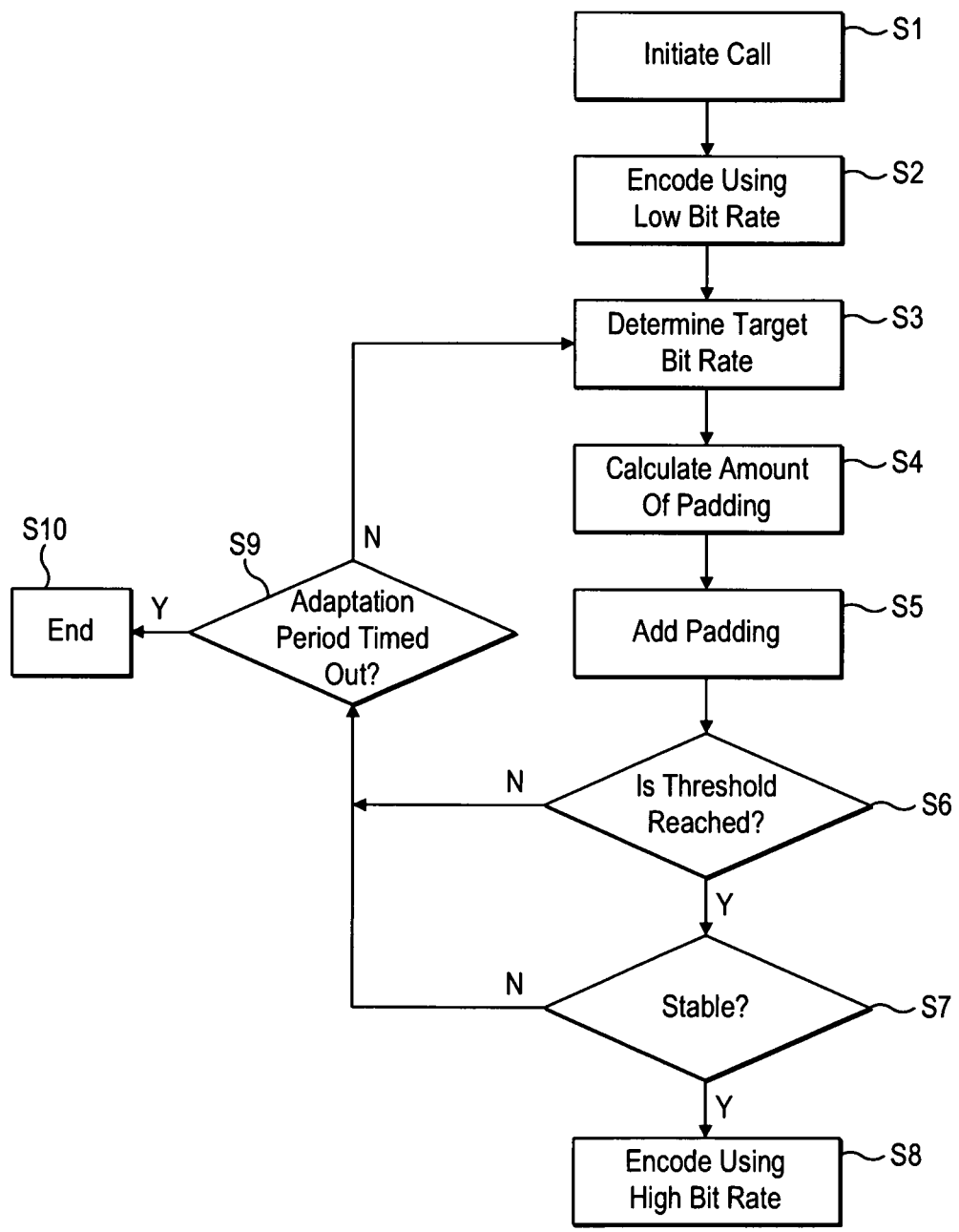
FIG. 3 is a flow chart illustrating a method for transmitting a data packet according to an embodiment of the invention.

The operation of the transmitting system according to an embodiment of the invention will now be described with reference to the flowchart shown in FIG. 3.

In step S1 a call is initiated by User A 102 to User B 114. A call connection between terminal 104 and terminal 118 is set up using a call-set-up protocol. During call set up, terminal 104 and terminal 118 negotiate which codecs may be used during the call to encode and decode the data. In accordance with an exemplary embodiment of the invention, terminals 104 and 118 confirm that a first codec having a fixed bit rate of 8 kbit/s and a second codec having a fixed bit rate of 64 kbit/s may be used during the call, and that padding bits may be added to the encoded data.

Following the initiation of the call, speech from User A 102 is input to the transmitting system 200 of terminal 104 via the microphone 202. The analogue to digital converter 204 is arranged to convert the input speech signal into a digital signal.

The digital signal output from the analogue to digital converter 204 is input into the encoding module 208.

In step S2 the encoding module 208 encodes the signal. According to a preferred embodiment of the invention, at the start of the call the encoding block is arranged to encode the signal at the fixed bit rate of 8 kbit/s. Encoding the signal using the lowest available bit rate ensures that the channel is not overloaded at the start of the call.

The encoding module 208 is arranged to output encoded frames to the packetizing module 209. The packetizing module 209 inserts the encoded frames into data packets. The data packets are queued for transmission in the network buffer 210 and transmitted from the user terminal 104 via a channel to user terminal 118.

In step S3 the bandwidth management module 206 is arranged to monitor whether the capacity of the channel is exceeded and to estimate a target bit rate that may be transmitted via the channel. If the capacity of the channel is not exceeded, the estimated target bit rate will be greater than the current bit rate of the packet stream output from the packetizing module 209. The target bit rate may be estimated for example by monitoring the round trip time of data packets sent between the terminals, monitoring the number of queued packets in the network buffer or monitoring an estimated bandwidth of the channel. The person skilled in the art will readily appreciate that there are a number of known methods that may be employed by the bandwidth management module to estimate the target bit rate. These methods will not be described further herein.

In accordance with embodiments of the invention the padding module is arranged to add padding bits to the data packets in dependence on the estimated target bit rate to cause the bit rate transmitted via the channel to gradually approach the bit rate of the second codec, provided that the capacity of the channel is not exceeded.

In step S4 the padding module is arranged to calculate the number of padding bits to be added to the payload of data packets received from the packetizing module 209 in order to incrementally adjust the bit rate transmitted via the channel. The value of the incremental bit rate adjustment is dependent on the target bit rate, therefore when the target bit rate is high, a larger adjustment will be made to the bit rate. In one embodiment of the invention the incremental bit rate adjustment is calculated according to:

$$\Delta BR_P = ((BR_{TCH} - BR_H) - BR_C) - BR_{P\ Current} \qquad \text{Equation (1)}$$

where: $\Delta BR_P$ is the incremental bit rate adjustment; $BR_{TCH}$ is the estimated target bit rate of the channel; $BR_H$ is the header bit rate; $BR_C$ is the codec bit rate and $BR_{P\ Current}$ is the current padding bit rate.

In an alternative embodiment of the invention the bit rate adjustment is determined from a look up table.

In step S5 the padding module 212 is arranged to increase the bit rate at which padding bits are added to the payload of the data packets output from the packetizing module 209 according to Equation (1).

The padding module 212 outputs the padded data packets to the network buffer 210. The network buffer 210 stores the data packets output from the network buffer 210 in a queue for transmission via the communication network 106.

In step S6, the padding module determines if the bit rate of the padded packet stream output from the padding module is equal to or more than a predetermined threshold bit rate value. In a preferred embodiment of the invention the threshold bit rate value is substantially equal to the bit rate at which the second codec encodes data. In the exemplary embodiment the threshold value is equal to 64 kbit/s.

If it is determined that the bit rate of the padded packet stream is less than the threshold bit rate value the method proceeds to step S9.

According to one embodiment of the invention the attempt to switch from low bit rate codec to the high bit rate codec is terminated after a predetermined adaption period. In step S9 it is determined if adaption period has expired. In a preferred embodiment of the invention the adaptation period expires after 2 minutes from the start of the call.

If the adaptation period has expired the method continues to step S11, the padding module 212 ceases to add padding bits to the data packets output from the packetizing module 209 and the digital signal output from the analogue to digital converter continues to be encoded using the low bit rate codec.

If however the adaptation time has not expired, the method returns to step S3 and the bandwidth management module is arranged to estimate a target bit rate for the channel when the padded data packets are transmitted. If the capacity of the channel is exceeded the target bit rate will decrease and the amount of padding determined in step S5 will be reduced. Conversely if the channel is not overloaded, the amount of padding determined in step S5 will increase, such that the bit rate of the padded packet stream output from the padding module incrementally approaches the bit rate of the second codec.

If however it is determined in step S6 that the bit rate of the padded packet stream is equal to or more than the threshold bit rate value, the method proceeds to step S7.

In step S7 the capacity of the channel is monitored by the bandwidth management module for a predetermined time, for example 30 seconds, to ensure that the channel does not become overloaded during this time.

If the capacity of the channel is not exceeded before the predetermined time expires, the capacity of the channel is determined to be stable and in step S8 the padding module controls the encoding module to encode the digital signal output from the analogue to digital converter using the second codec.

If however the channel becomes overloaded during the predetermined time, the method continues to step S9.

In one embodiment of the invention the bandwidth management module will continue to monitor the capacity of the channel after the adaptation period has expired. If the capacity of the channel is exceeded significantly, for example if the target bit rate is estimated to be 45 kbit/s, or slightly for a longer time period, for example if the target bit rate is estimated be 58 kbit/s for 30 seconds, the bandwidth management module reports that the channel capacity is exceeded to the padding module. In response, the padding module is arranged to control the encoding module to encode the digital signal output from the analogue to digital converter using the first codec. According to this embodiment of the invention the digital signal is not encoded using the first codec if it is determined that the capacity of the channel is only exceeded slightly for a shorter time period. This allows minor fluctuations in the network conditions to be tolerated.

Figure 4:
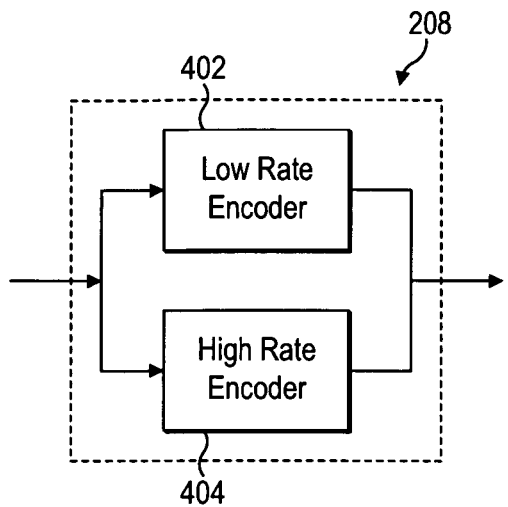
FIG. 4 is a diagram of an encoder module.

Reference will now be made to FIG. 4 which shows the encoding module 208 in more detail. The encoding module 208 comprises a low bit rate encoder 402, and a high bit rate encoder 404.

The low bit rate encoder 402 may be arranged to encode data using a codec with a fixed low bit rate such as G.729. Alternatively, the low rate encoder may be arranged to encode the data using a codec with an adaptive low bit rate.

The high bit rate encoder may be arranged to encode data using a codec with a fixed high bit rate such as G.722. Alternatively, the high rate encoder may be arranged to encode the data using a codec with an adaptive high bit rate.

In operation, the digital signal is input to the encoding module 208 from the analogue to digital converter 204. The encoding module is arranged to encode the digital signal using either the low bit rate encoder or the high bit rate encoder according to the method previously described with reference to FIG. 3.

Encoded data frames output from either the high bit rate encoder or the low bit rate encoder, are output from the encoding module and input into the packetizing module 209 shown in FIG. 2.

Figure 5A:
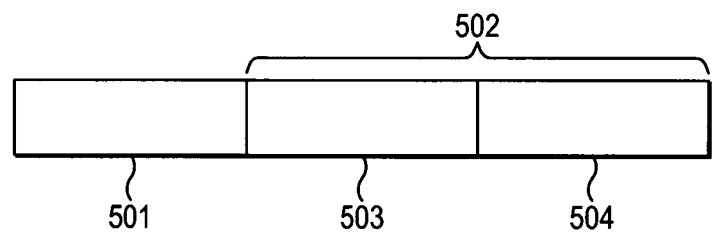
FIG. 5a is a schematic representation of a data packet.

FIG. 5*a* shows a data packet output from the packetizing module 209. The data packet comprises a header 501 and a payload 502. The payload 502 comprises two encoded frames 503, 504. The data packets output from the packetizing module 209 are input to into the padding module 212.

Figure 5B:
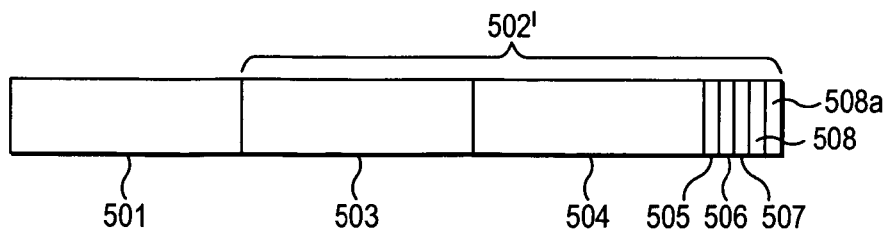
FIG. 5b is a schematic representation of a padded data packet according to an embodiment of the invention.

As described above, the padding module 212 is arranged to modify the data packet by adding padding bits to the payload of the data packet in order to increase the bit rate of the packet stream output from the terminal 104. FIG. 5*b* shows a data packet having a modified payload 502'

In accordance with a preferred embodiment of the invention the padding bits are added to the payload of the data packet in padding blocks, wherein each padding block comprises two bytes.

The modified payload 502' includes the padding blocks inserted by the padding module 212. FIG. 5*b* shows four padding blocks 505, 506, 507, 508, in the modified payload 502' of the data packet.

According to a preferred embodiment of the invention, a one byte tailing block 508*a* indicates the number of padding blocks included in the modified data packet. In this case the tailing block will indicate that there are four padding blocks in the payload.

According to a preferred embodiment of the invention, padding blocks are arranged to be an even number of bytes and tailing blocks are arranged to be an odd number of bytes. As such an odd number of bytes will be added to the payload of a data packet to create a padded data packet. In accordance with an embodiment of the invention, wherein the encoding module is arranged to output encoded frames comprising an even number of bytes, a receiving terminal may be arranged to monitor the number of bytes in the data packet to determine whether a packet is padded. The operation of the second user terminal will now be described with reference to FIG. 6.

Figure 6:
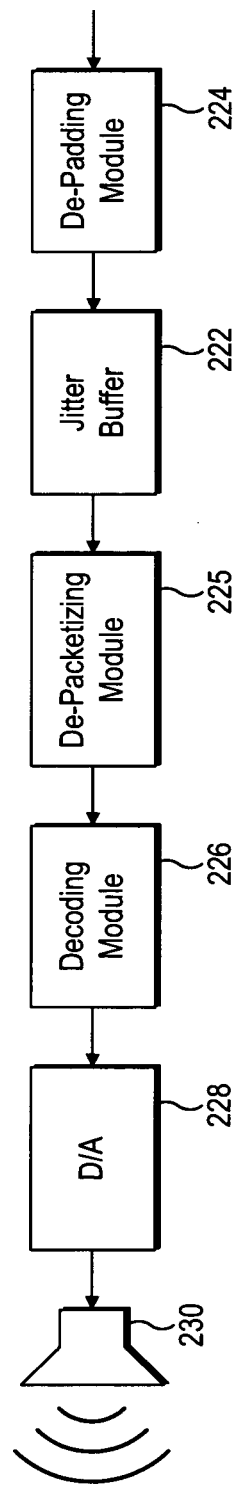
FIG. 6 is a diagram of a receiver.

FIG. 6 shows a receiving system of the second user terminal 114 for receiving data from the network 106.

The receiving system 220 comprises a de-padding module 224, a jitter buffer 222, a de-packetizing module 225, a decoding module 226, a digital to analogue converter 228 and a speaker 230. It should be appreciated that the first user terminal 104 comprises an equivalent receiving system for receiving data from the network.

Components of the receiving system may be implemented as hardware in the terminal or as software running on a processor in the terminal. This is an implementation preference.

Figure 7:
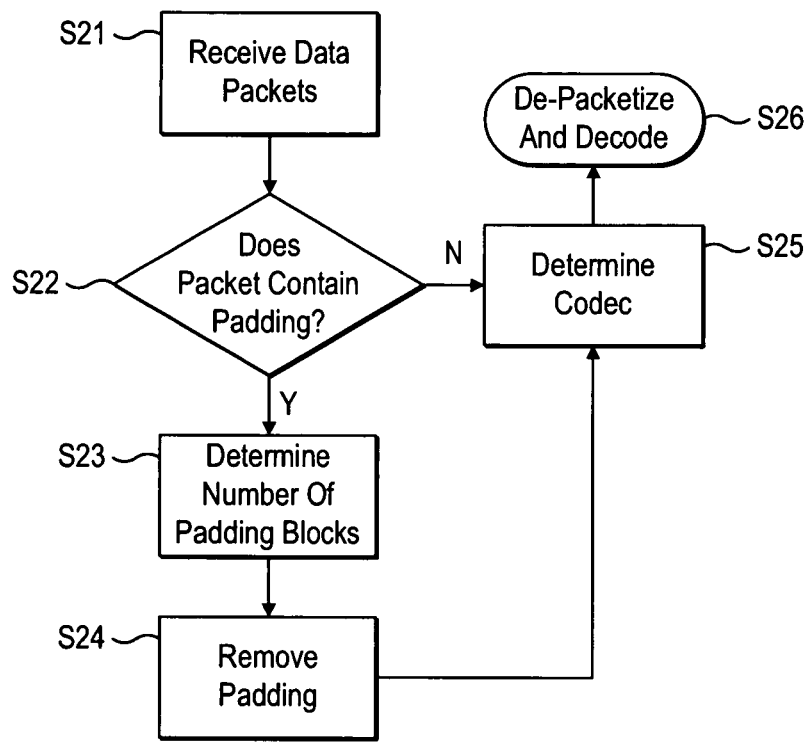
FIG. 7 is a flow chart illustrating a method for receiving a data packet according to an embodiment of the invention.

The method of receiving padded data packets at the receiving system 220 will now be described with reference to the flowchart shown in FIG. 7.

Following the initiation of a call with user terminal 104, in step S21 data packets are received from user terminal 104.

In step 22 the received data packets are input into the de-padding module 224. The de-padding module is arranged to determine if the received packet contains padding.

In accordance with an embodiment of the invention, information relating to the number of bytes in an unpadded data packet and a padded packet, respectively may be used by the de-padding module to determine whether a packet comprises padding. In general VoIP systems use data packets that each contain N*10 ms blocks of audio data, where N is an integer. As such data packet containing data encoded using G.722 which uses one byte per two samples of a 16 kHz signal will contain N*80 bytes. Thus a data packet containing data encoded using G.722 will comprise an even number of bytes. Similarly, a packet containing data encoded using G.729 uses N*10 bytes. Thus a data packet encoded using G.729 will comprise an even number of bytes. As described previously, an odd number of padding bytes may be added to a packet by the padding module. In this exemplary embodiment if the number of bytes in the payload of the packet is even, the de-padding block is arranged to determine that the data packet is unpadded; however if the number of bytes in the payload of the data packet is odd, the de-padding module is arranged to determine that the data packet contains padding blocks. In this exemplary embodiment padding blocks are only added to data packets encoded using G.729.

If it is determined that the packet does contain padding blocks, the method continues to step S23. If however it is determined that the packet does not contain padding blocks the method continues directly to step S25.

In step S23 the de-padding module is arranged to analyse the tailing block to determine the number of padding blocks included in the payload of the packet.

In step S24 the de-padding block is arranged to remove the number of blocks determined in step S23 from the payload of the packet. The method then continues to step S25.

In step S25 the de-padding module is arranged to determine the codec used to encode the data at the user terminal 104. In a preferred embodiment of the invention the de-padding module is arranged to determine if the number of bytes in the payload of the data packet is above a predetermined threshold value. If the number of bytes in the payload of the data packet is equal to or above the threshold value, the de-padding module determines that the packet is encoded using the high bit rate codec. If however the number of bytes in the payload of the data packet is below the threshold value, the de-padding module determines that the packet is encoded using the low bit rate codec. In the exemplary embodiment of the invention the data packets encoded using the low bit rate codec each contain between 10 to 70 ms of audio data and the threshold value used to determine if the packet is encoded using the low bit rate codec is 80 bytes.

In response to determining which codec is used to encode the data, the de-padding module is arranged to control the decoding module to decode the data using the determined codec.

In step S26 the data packet is output to the jitter buffer 222 where the data packet is queued before being output to the de-packetizing module 225. The de-packetizing module is arranged to remove the encoded frames from the payload of the data packet. The encoded frames are then output from the de-packetizing module 225 and input into the decoding module 226. The decoding module is arranged to decode the encoded frames and output a digital signal. The digital signal is then converted to an analogue signal by the digital to analogue converter 228 and output by the speaker 230.

Figure 8:
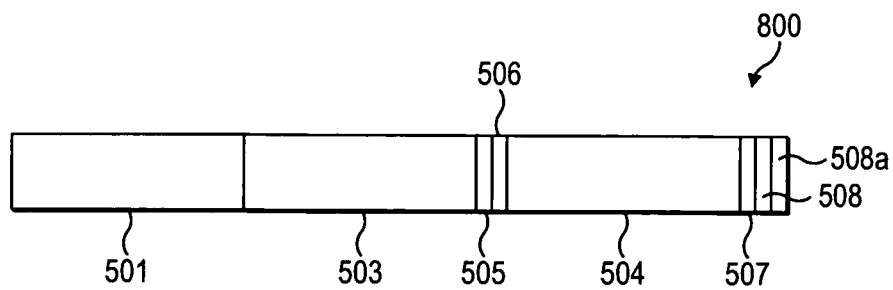
FIG. 8 is a schematic representation of a padded data packet according to an alternative embodiment of the invention.

In an alternative embodiment of the invention the encoding module may be arranged to add padding bits to the frames output from the encoding module. FIG. 8 shows a data packet 800 containing padding that has been added to each frame output from the encoding module. In this embodiment the padding blocks 505, 506, 507 and 508 are positioned between the encoded frames 503 and 504.

According to a preferred embodiment of the invention the padding block may contain zeros.

While this invention has been particularly shown and described with reference to preferred embodiments, it will be understood to those skilled in the art that various changes in form and detail may be made without departing from the scope of the invention as defined by the appendant claims.

In particular, a number of alternative embodiments can be implemented as discussed in the following.

For example, in the embodiments described above the invention is implemented at the user terminals. In alternative embodiments the invention may be implemented at a network node such as a relay peer node between the user terminals, or at a server.

In one embodiment of the invention the padding block may be used for forward error correction In the embodiment described above the receiving system is arranged to determine if a data packet comprises padding by analysing the length of the data packet. However in an alternative embodiment of the invention, information relating to whether the data packet contains padding may be provided in the data packet using a known standard RTP (Real-time Transport Protocol). According to such an embodiment of the invention the padding module is arranged to set a flag in the header of the data packet to indicate that the data packet contains padding blocks. The last byte of padding indicates how many padding bytes are present in the data packet. As such, any receiving system that supports RTP sessions can be used to remove the padding bits that are added to the data packets in accordance with embodiments of the present invention. In this case it is only necessary for the terminals to agree on which codecs should be used to encode and decode the data.

In accordance with an alternative embodiment of the invention, padding blocks may be included in separate data packets independent from the encoded data packets.

In one embodiment of the invention the bandwidth management module is arranged to instruct the padding module to either 'increase' the bit rate if it is determined that the channel capacity is not exceeded, or 'decrease' the bit rate if it is determined that the channel capacity is exceeded. In response, the padding module is arranged to adjust the bit rate of the signal by a predetermined amount.

In an alternative embodiment of the invention the adaptation period described in step S9 may continue for the duration of a call. Alternatively the adaptation period may be restarted after a predetermined time.

In an alternative embodiment of the invention information relating to the codec used to encode the data will be provided in the header of the data packet. Thus in step S25 the de-padding module may be arranged to determine codec used to encode the data by analysing the header of the data packet.

The invention claimed is:
1. A method comprising:
receiving data at a first node;
encoding a first portion of said data at a first bit rate to generate a first encoded data stream;
monitoring an indication of a capacity of a channel of a communication network;
adding padding blocks to the first encoded data stream based on the indication of the capacity of the channel to generate a padded data stream, each padding block comprising an even number of bytes;
adding a tailing block to the first encoded data stream that indicates the number of padding blocks added to the first encoded data stream, the tailing block comprising an odd number of bytes;
transmitting, to a second node, the padded data stream via said channel;
determining if transmitting said padded data stream exceeds the capacity of the channel;
encoding a second portion of said data at a higher bit rate than the first bit rate to generate a second encoded data stream responsive to determining that transmitting the padded data stream does not exceed the capacity of the channel; and transmitting the second encoded data stream to the second node via said channel the adding padding blocks to the first encoded data stream further comprising incrementally increasing a number of padding bits added to the first encoded data stream responsive to determining that the capacity of the channel is not exceeded, and the incrementally increasing comprising making a plurality of incremental increases to the padding bits before the second portion is encoded at the higher bit rate, said determining being performed after each incremental increase, and each successive incremental increase being made based on a respective determination that the capacity of the channel is not exceeded.

2. A method as claimed in claim 1 further comprising encoding the second portion of said data at the first bit rate responsive to determining that transmitting the padded data stream exceeds the capacity of the channel.

3. A method as claimed in claim 1, further comprising responsive to determining that transmitting the padded data stream does not exceed the capacity of the channel, determining if the bit rate of the padded data steam is substantially equivalent to the higher bit rate.

4. A method as claimed in claim 3 wherein the second portion of said data is encoded at a higher bit rate if it is determined that the bit rate of the padded data stream is substantially equivalent to the higher bit rate.

5. A method as claimed in claim 1 wherein the monitoring the indication of the capacity of the channel further comprises monitoring if the capacity of the channel is exceeded.

6. A method as claimed in claim 1 wherein the monitoring the indication of the capacity of the channel further comprises determining a target bit rate.

7. A method as claimed in claim 1 wherein the number of padding bits is incrementally increased by a predetermined amount.

8. A method as claimed in claim 6 wherein the number of padding bits is incrementally increased by an amount dependent on the target bit rate.

9. A method as claimed in claim 1 wherein the padding bits comprise zeros.

10. A method as claimed in claim 1 wherein the padding bits comprise forward error correction data.

11. A method as claimed in claim 1 wherein the encoding the first portion of said data at the first bit rate further comprises encoding the first portion of said data using either a fixed low bit rate encoding method or a low rate mode of an adaptive bit rate encoding method.

12. A method as claimed in claim 1 wherein the encoding the second portion of said data at the higher bit rate further comprises encoding the second portion of said data using either a fixed high bit rate encoding method or a high rate mode of an adaptive bit rate encoding method.

13. A method as claimed in claim 1 wherein the adding padding blocks to the first encoded data stream further comprises inserting padding bits into data packets of the first encoded data stream.

14. A method as claimed in claim 13 wherein the even number of bytes in each padding block and the odd number of bytes in the tailing block are added to a payload of a padded data packet and enable a receiving terminal at the second node to determine whether the data is padded by monitoring the number of bytes in the payload of the padded data packet.

15. A method as claimed in claim 1 wherein the communication network is a voice over internet protocol (VoIP) network.

16. A method as claimed in claim 1 wherein the data packet comprises audio data.

17. A transmitter configured to transmit data to a node via a channel of a communication network, said transmitter comprising:
an input module configured to receive data to be transmitted;
an encoding module configured to encode said received data at either a first bit rate or a second bit rate to generate an encoded data stream, wherein the second bit rate is higher than the first bit rate;
an output module configured to transmit the encoded data stream to the node via the channel;
a bandwidth management module configured to monitor an indication of a capacity of the channel;
a padding module configured to add padding blocks to the encoded data stream when encoded at the first bit rate based on the indication of the capacity of the channel to generate a padded data stream, each padding block comprising an even number of bytes, the padding module further configured to add a tailing block to the encoded data stream that indicates the number of padding blocks added to the encoded data stream, the tailing block comprising an odd number of bytes the padding module configured to add the padding blocks by incrementally increasing a number of padding bits added to the first encoded data stream responsive to determining that the capacity of the channel is not exceeded, the bandwidth management module further configured to determine if transmitting said padded data stream exceeds the capacity of the channel, and control the encoding module to encode said received data at the second bit rate responsive to determining that transmitting the padded data stream does not exceed the capacity of the channel, and the padding module and bandwidth management module further configured to incrementally increase the number of padding bits by making a plurality of incremental increases to the padding bits before the received portion is encoded at the higher bit rate, said determining being performed after each incremental increase, and each successive incremental increase being made based on determining that the capacity of the channel is not exceeded.

18. A method as claimed in claim 17 wherein the even number of bytes in each padding block and the odd number of bytes in the tailing block are added to a payload of a padded data packet and enable a receiving terminal at the node to determine whether the data is padded by monitoring the number of bytes in the payload of the data packet.

* * * * *